US009026271B1

(12) United States Patent
Madden

(10) Patent No.: US 9,026,271 B1
(45) Date of Patent: May 5, 2015

(54) VEHICULAR ACCELEROMETER AND VEHICULAR DATA RECORDING SYSTEM

(71) Applicant: Glenn Madden, Walpole, NH (US)

(72) Inventor: Glenn Madden, Walpole, NH (US)

( * ) Notice: Subject to any disclaimer, the term of this patent is extended or adjusted under 35 U.S.C. 154(b) by 0 days.

(21) Appl. No.: 14/144,883

(22) Filed: Dec. 31, 2013

(51) Int. Cl.
*G01P 13/00* (2006.01)
*G06Q 40/00* (2012.01)
*G07C 5/00* (2006.01)

(52) U.S. Cl.
CPC ..................................... *G07C 5/008* (2013.01)

(58) Field of Classification Search
USPC ......... 701/1, 2, 29.1, 408, 500; 340/438, 988; 455/39; 702/188
See application file for complete search history.

(56) References Cited

U.S. PATENT DOCUMENTS

| | | | | |
|---|---|---|---|---|
| 3,704,344 | A | 11/1972 | Newmeyer | |
| 4,093,939 | A | 6/1978 | Mitchell | |
| 5,465,079 | A | 11/1995 | Bouchard | |
| 6,076,028 | A | 6/2000 | Donnelly | |
| 6,240,773 | B1 | 6/2001 | Rita | |
| 6,525,672 | B2 * | 2/2003 | Chainer et al. | 340/904 |
| 6,701,234 | B1 | 3/2004 | Vogelsang | |
| 6,928,625 | B2 | 8/2005 | Makinen | |
| D519,859 | S | 5/2006 | Chinnadurai | |
| 7,873,345 | B1 * | 1/2011 | Dunne et al. | 455/404.1 |
| 8,140,358 | B1 * | 3/2012 | Ling et al. | 705/4 |
| 8,799,034 | B1 * | 8/2014 | Brandmaier et al. | 705/4 |
| 2004/0198466 | A1 * | 10/2004 | Walby et al. | 455/574 |
| 2011/0063138 | A1 * | 3/2011 | Berkobin et al. | 340/988 |
| 2012/0136573 | A1 * | 5/2012 | Janardhanan et al. | 701/512 |
| 2013/0325250 | A1 * | 12/2013 | Cawse | 701/33.1 |
| 2013/0332007 | A1 * | 12/2013 | Louboutin | 701/2 |
| 2014/0206392 | A1 * | 7/2014 | Mauti, Jr. | 455/456.3 |
| 2015/0002281 | A1 * | 1/2015 | Berkobin et al. | 340/426.19 |

FOREIGN PATENT DOCUMENTS

| | | |
|---|---|---|
| CN | 102831670 | 12/2012 |

* cited by examiner

*Primary Examiner* — Ronnie Mancho
(74) *Attorney, Agent, or Firm* — Kyle A. Fletcher, Esq.

(57) ABSTRACT

The data recording assembly for monitoring and recording the activity of a vehicle includes an accelerometer coupled to the vehicle. A first transceiver is coupled to the accelerometer. A recorder is coupled to the vehicle. A processor is coupled to the recorder. An electronic memory is coupled to the recorder. A second transceiver is coupled to the recorder and is in communication with the first transceiver. A gps is coupled to the recorder. The gps is in communication with a satellite. A clock is coupled to the recorder. A remote unit is provided. A remote processor is coupled to the remote unit. A remote electronic memory is coupled to the remote unit. A remote transceiver is coupled to the remote unit and is in communication with the second transceiver. A display is coupled to the remote unit. An actuator is coupled to the remote unit.

20 Claims, 4 Drawing Sheets

VEHICULAR ACCELEROMETER AND VEHICULAR DATA RECORDING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of data recording systems, more specifically, accelerometer and vehicular data recording systems.

SUMMARY OF THE INVENTION

An embodiment of the disclosure meets the needs presented above by generally comprising an accelerometer coupled to the vehicle. A first transceiver is coupled to the accelerometer. A recorder is coupled to the vehicle. A processor is coupled to the recorder. An electronic memory is coupled to the recorder. The electronic memory is operationally coupled to the processor. A second transceiver is coupled to the recorder. The second transceiver is operationally coupled to the electronic memory. The second transceiver is in communication with the first transceiver. The second transceiver receives data from the gps is coupled to the recorder. The gps is operationally coupled to the processor. The gps is in communication with a satellite so the gps determines a location of the vehicle. A clock is coupled to the recorder. The clock is operationally coupled to the gps. The clock monitors a time of the vehicle's activity. A remote unit may be carried by a user. A remote processor is coupled to the remote unit. A remote electronic memory is coupled to the remote unit. The remote electronic memory is operationally coupled to the remote processor. A remote transceiver is coupled to the remote unit. The remote transceiver is operationally coupled to the remote electronic memory. The remote transceiver is in communication with the second transceiver. The remote transceiver receives the data from the second transceiver so the data is stored in the remote electronic memory. A display is coupled to the remote unit so the display is accessible to the user. The display is operationally coupled to the remote processor. An actuator is coupled to the remote unit. The actuator is operationally coupled to the remote processor so the actuator actuates the remote processor.

An object of the invention is to provide a device that is accelerometer and a vehicular data recording system.

These together with additional objects, features and advantages of the vehicular accelerometer and vehicular data recording system will be readily apparent to those of ordinary skill in the art upon reading the following detailed description of presently preferred, but nonetheless illustrative, embodiments of the vehicular accelerometer and vehicular data recording system when taken in conjunction with the accompanying drawings.

In this respect, before explaining the current embodiments of the vehicular accelerometer and vehicular data recording system in detail, it is to be understood that the vehicular accelerometer and vehicular data recording system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of vehicular accelerometer and vehicular data recording system.

It is therefore important that the claims be regarded as including such equivalent construction insofar as they do not depart from the spirit and scope of vehicular accelerometer and vehicular data recording system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
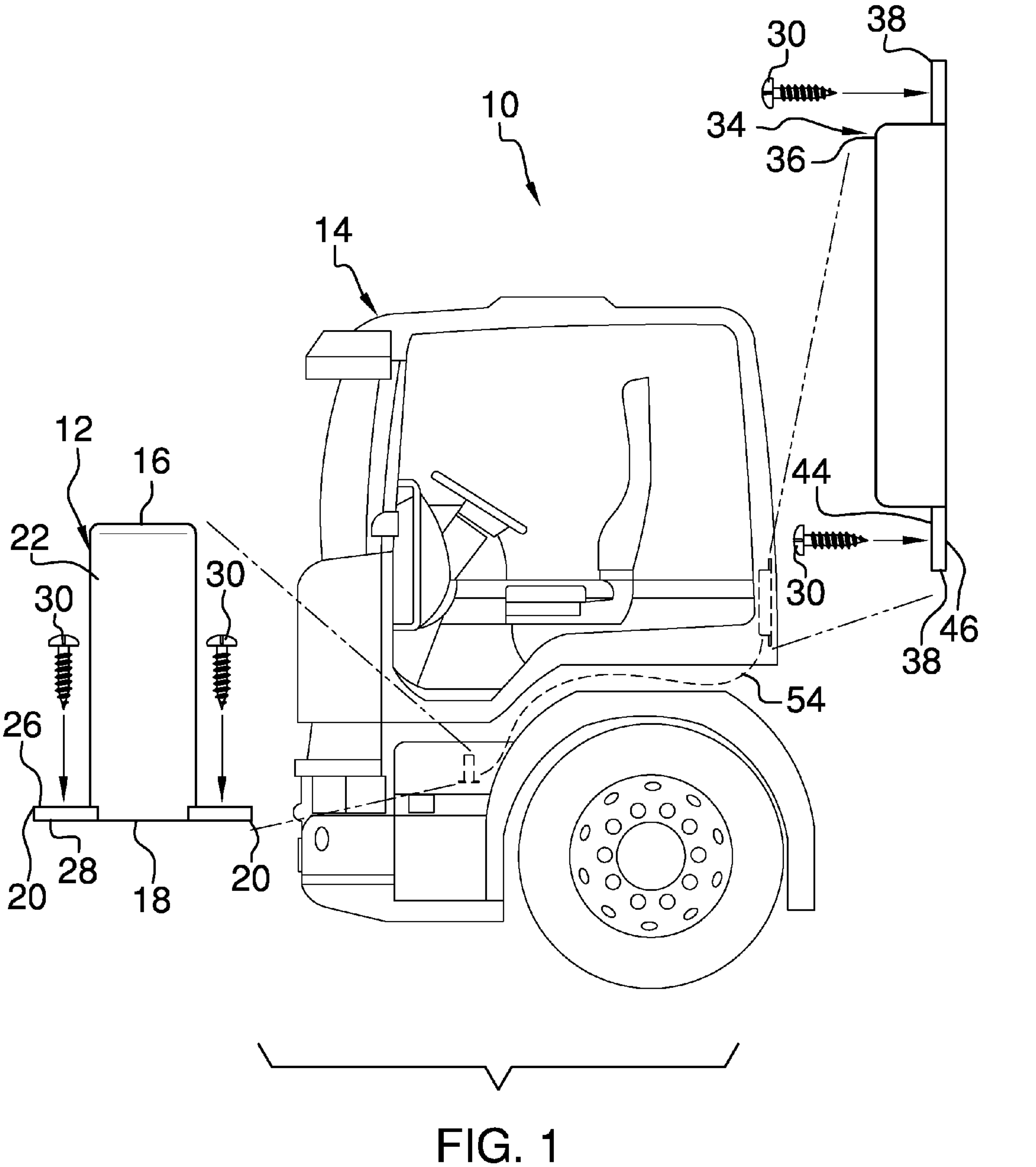
FIG. 1 is an in-use view of a data recording assembly according to an embodiment of the disclosure.
Figure 2:
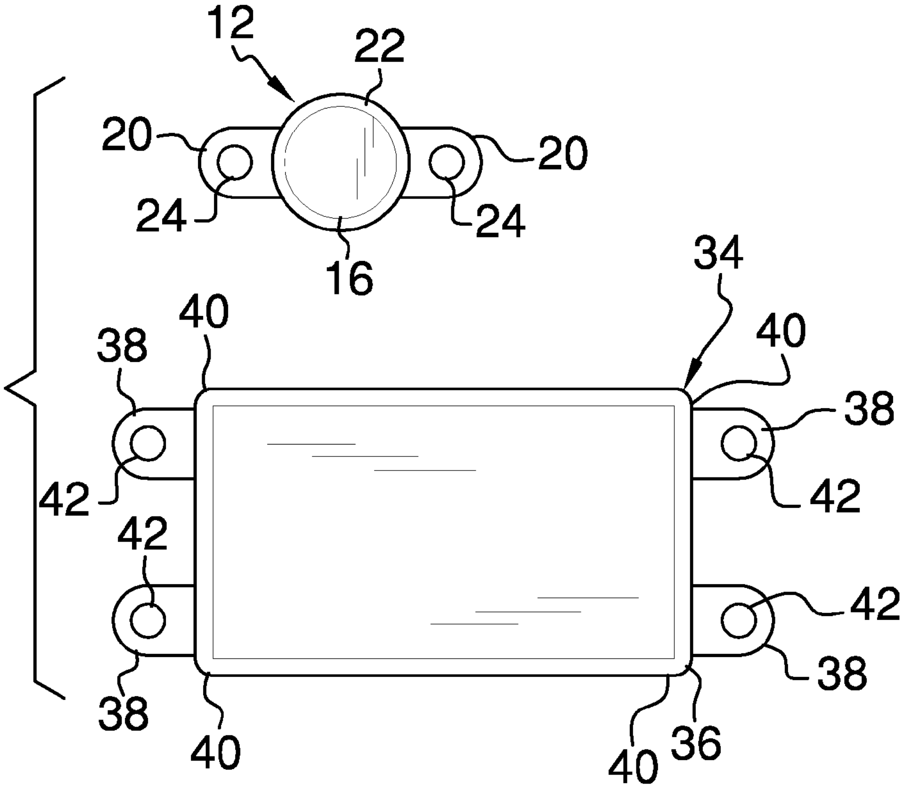
FIG. 2 is a top view of an embodiment of the disclosure.
Figure 3:
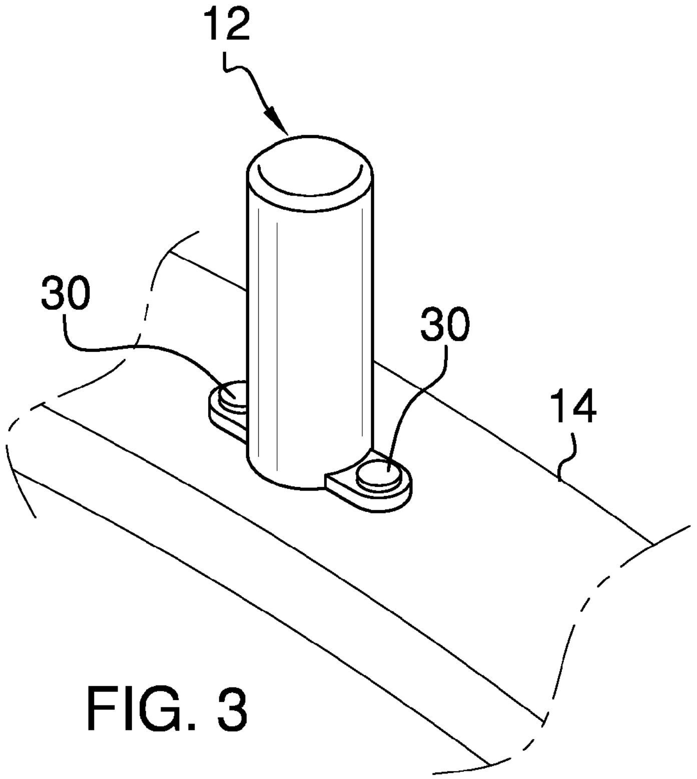
FIG. 3 is a perspective view of an embodiment of the disclosure.
Figure 4:
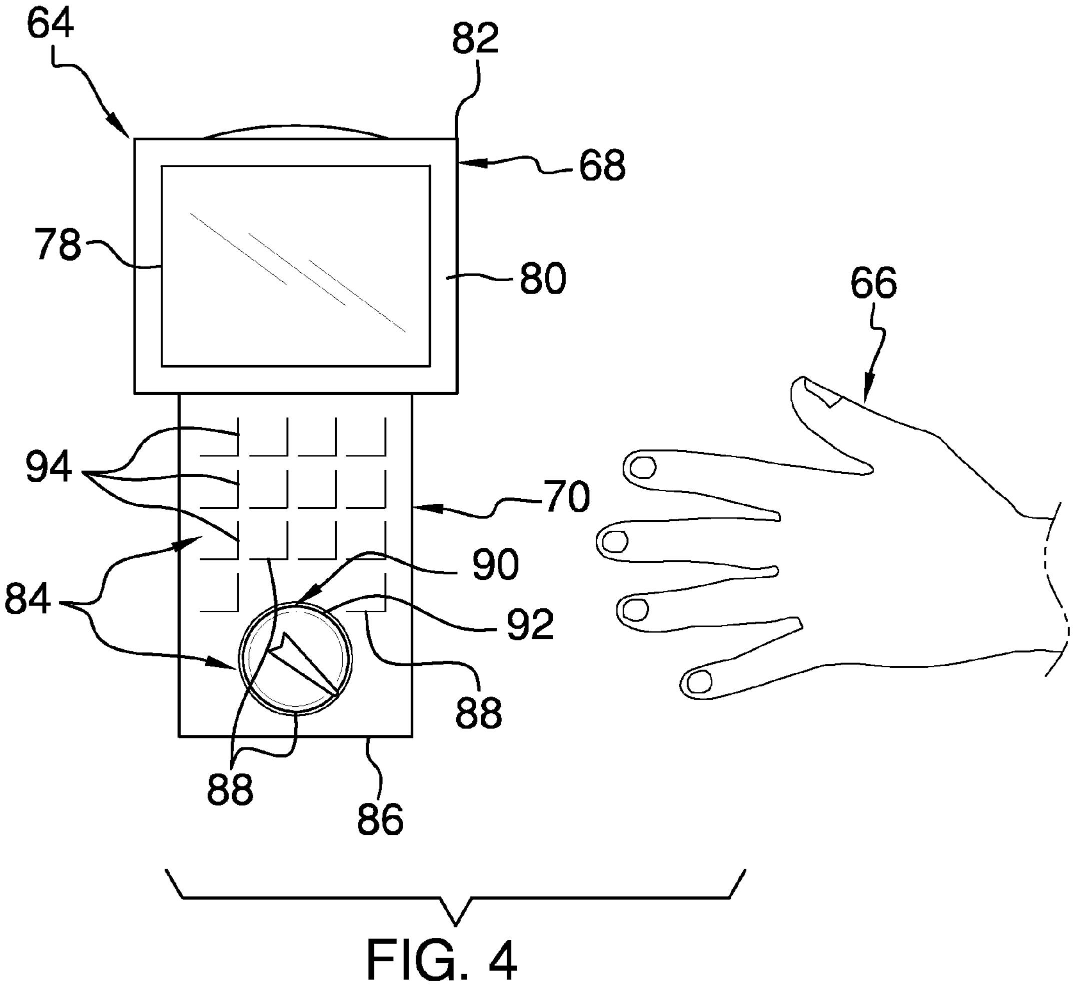
FIG. 4 is a front view of an embodiment of the disclosure.
Figure 5:
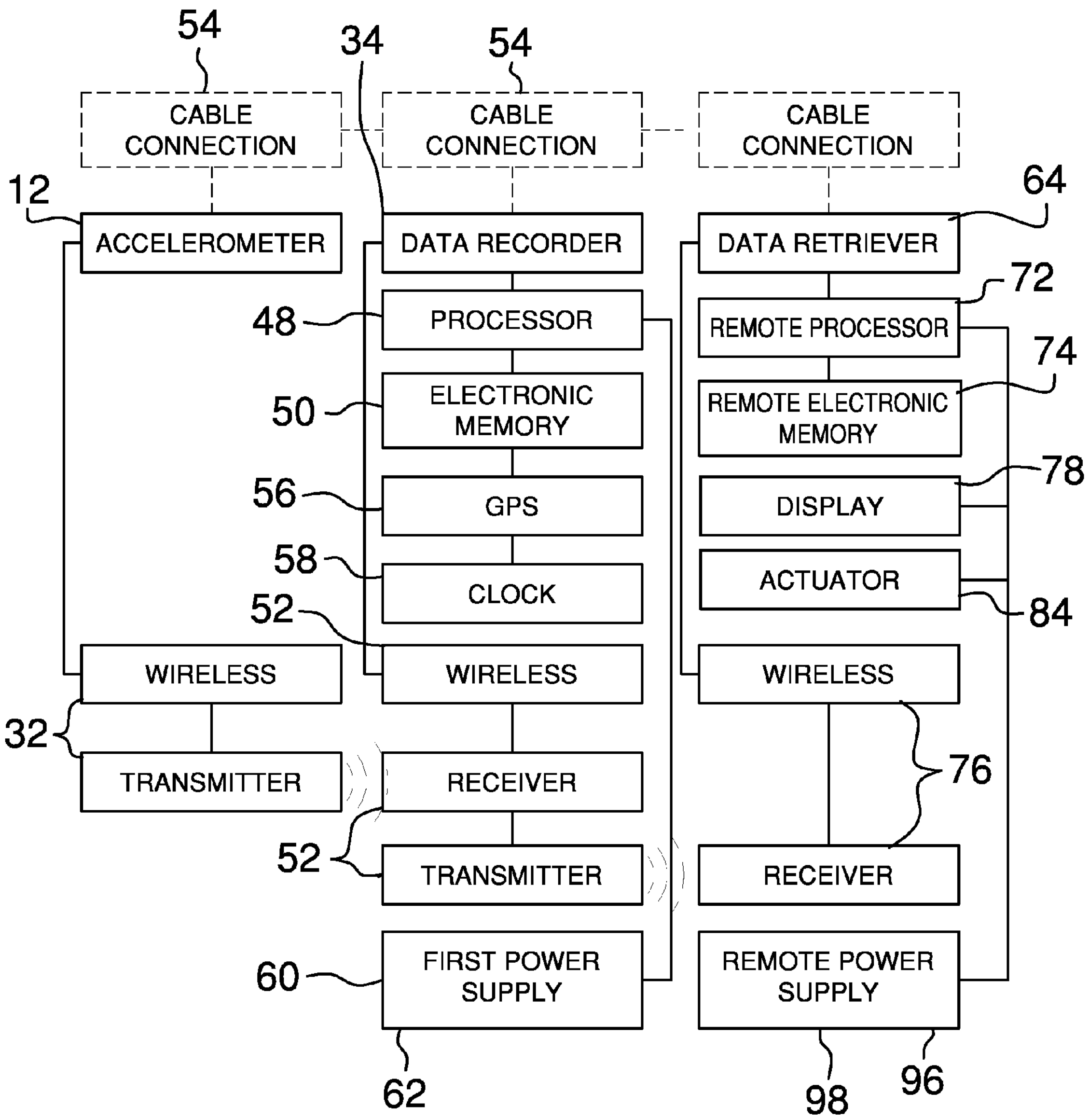
FIG. 5 is a schematic view of an embodiment of the disclosure.

As best illustrated in FIGS. 1 through 5, the data recording assembly 10 generally comprises an accelerometer 12 coupled to a vehicle 14. The vehicle 14 may be an industrial vehicle of any conventional design. Continuing, the accelerometer 12 is elongated along a longitudinal axis extending through a top end 16 and a bottom end 18 of the accelerometer 12. Moreover, the accelerometer 12 could have a cylindrical shape. Lastly, the accelerometer 12 may be an accelerometer of any conventional design.

A pair of tabs 20 is coupled to and extends laterally away from opposite sides of an outer wall 22 of the accelerometer 12 proximate the bottom end 18 of the accelerometer 12. A fastener aperture 24 extends through a top side 26 and a bottom side 28 of each of the pair of tabs 20. Additionally, a fastener 30 extends through each of the fastener apertures 24 and engages the vehicle 14. The fastener 30 retains the accelerometer 12 on the vehicle 14. A first transceiver 32 is coupled to the accelerometer 12. The first transceiver 32 may be an RF transceiver of any conventional design.

A recorder 34 is coupled to the vehicle 14. An outer wall 36 of the recorder has a length is greater than a width of the outer wall 36 of the recorder 34. The recorder 34 has a rectangular parallelepiped shape that may have a length between 7 cm and 10 cm, a width between 5 cm and 7 cm and a height between 2 cm and 3 cm.

A plurality of tabs 38 is coupled to and extends laterally away from the outer wall 36 of the recorder 34 proximate an associated one of each of four corners 40 of the outer wall 36 of the recorder 34. A fastener aperture 42 extends through a top side 44 and a bottom side 46 of each of the plurality of tabs 38. Additionally, a fastener 30 extends through each of the fastener apertures 42 and engages the vehicle 14. The fastener 30 retains the recorder 34 on the vehicle 14.

A processor 48 is coupled to the recorder 34. The processor 48 may be an electronic processor of any conventional design. An electronic memory 50 is coupled to the recorder 34. The electronic memory 50 is electrically coupled to the processor 48. Lastly, the electronic memory 50 may be ROM memory of any conventional design.

A second transceiver 52 is coupled to the recorder 34. The second transceiver 52 is electrically coupled to the electronic memory 50. Moreover, the second transceiver 52 is in electromagnetic communication with the first transceiver 32. The second transceiver 52 receives data from the accelerometer 12. Additionally, the data is stored in the electronic memory 50. Lastly, the second transceiver 52 may be an RF transceiver of any conventional design. Alternatively, an electrical cable 54 may be electrically coupled between the first transceiver 32 and the second transceiver 52.

A gps 56 is coupled to the recorder 34. The gps 56 is electrically coupled to the processor 48. Additionally, the gps 56 is in electromagnetic communication with a satellite so the gps 56 determines a location of the vehicle 14. Lastly, the gps 56 may be a gps of any conventional design.

A clock 58 is coupled to the recorder 34. The clock 58 is electrically coupled to the gps 56. Further, the clock 58 monitors a time of the vehicle's 14 activity. Lastly, the clock 58 may be a digital clock of any conventional design.

A first power supply 60 is coupled to the recorder 34. The first power supply 60 is electrically coupled to the processor 48. Moreover, the first power supply 60 comprises at least one battery 62. Lastly, the first power supply 60 may have an operational voltage between 3 VDC and 28 VDC.

A remote unit 64 may be carried by a user 66. An upper portion 68 of the remote unit 64 may have a width and a height between 10 cm and 15 cm and a depth between 5 cm and 7 cm. Additionally, a lower portion 70 of the remote unit 64 may have a width between 8 cm and 13 cm, a height between 15 cm and 20 cm and a depth between 5 cm and 7 cm.

A remote processor 72 is coupled to the remote unit 64. The remove processor 72 may be an electronic processor of any conventional design. A remote electronic memory 74 is coupled to the remote unit 64. The remote electronic memory 74 is electrically coupled to the remote processor 72. Lastly, the remote electronic memory 74 may be RAM memory of any conventional design.

A remote transceiver 76 is coupled to the remote unit 64. The remote transceiver 76 is electrically coupled to the remote electronic memory 74. Moreover, the remote transceiver 76 is in selective electromagnetic communication with the second transceiver 52. The remote transceiver 76 receives the data from the second transceiver 52. The data is stored in the remote electronic memory 74. Additionally, a program is stored in the remote electronic memory 74. The program selectively generates a report based on the data from the accelerometer 12.

A display 78 is coupled to a front side 80 of an outer wall 82 of the remote unit 64. The display 78 is positioned on the upper portion 68 of the remote unit 64 so the display 78 is accessible to the user 66. Additionally, the display 78 is electrically coupled to the remote processor 72. The display 78 displays indicia. The indicia comprise letter relating to the report generated by the program in the remote electronic memory 74. Lastly, the display 78 may be an LCD display of any conventional design.

An actuator 84 is coupled to the front side 80 of the outer wall 82 of the remote unit 64 proximate a bottom side 86 of the outer wall 82 of the remote unit 64. The actuator 84 is positioned on the lower portion 70 of the remote unit 64. Additionally, the actuator 84 is electrically coupled to the remote processor 72 so the actuator 84 actuates the remote processor 72. The actuator 84 is one of a plurality of the actuators 88.

A first one of the plurality of actuators 90 comprises a dial 92 rotatably coupled to the remote unit 64. The dial 92 is positionable at a selected position to select an operational parameter of the remote unit 64. Continuing, the remaining ones of the plurality of actuators 94 are positioned between the dial 92 and the display 78. The remaining plurality of actuators 94 comprise each letter of the alphabet. Lastly, the remaining plurality of actuators 94 selectively enter data into the remote electronic memory 74.

A remote power supply 96 is coupled to the remote unit 64. The remote power supply 96 is electrically coupled to the remote processor 72. Further, the remote power supply 96 comprises at least one battery 98. Lastly, the remote power supply 96 may have an operational voltage between 3 VDC and 9 VDC.

In use, the user 66 downloads the data from the recorder 34 into the remote unit 64. Continuing, the data in the remote unit 64 is compiled into the report showing the activities of the vehicle 14 and the time associated with the activity. The report shows the vertical, semi-vertical, or horizontal acceleration of the vehicle 14, the deceleration of the vehicle 14, the average speed of the vehicle 14, and any accidental impact on the vehicle 14. Lastly, the report is used to monitor the activity of the vehicle 14, as well as identifying ways to improve the efficiency of the vehicle's 14 operation.

With respect to the above description, it is to be realized that the optimum dimensional relationship for the various components of the data recording assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the data recording assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A data recording assembly for monitoring and recording the activity of a vehicle, said assembly comprising:

an accelerometer coupled to the vehicle;

a first transceiver coupled to said accelerometer;

a recorder coupled to the vehicle;

a processor coupled to said recorder;

an electronic memory coupled to said recorder, said electronic memory being operationally coupled to said processor;

a second transceiver coupled to said recorder, said second transceiver being operationally coupled to said electronic memory, said second transceiver being in communication with said first transceiver wherein said second transceiver receives data from said accelerometer wherein the data is stored in said electronic memory;

a gps coupled to said recorder, said gps being operationally coupled to said processor, said gps being in communication with a satellite wherein said gps determines a location of the vehicle;

a clock coupled to said recorder, said clock being operationally coupled to said gps, said clock monitoring a time of the vehicle's activity;

a remote unit configured to be carried by a user;

a remote processor coupled to said remote unit;

a remote electronic memory coupled to said remote unit, said remote electronic memory being operationally coupled to said remote processor;

a remote transceiver coupled to said remote unit, said remote transceiver being operationally coupled to said remote electronic memory, said remote transceiver being in communication with said second transceiver wherein said remote transceiver receives the data from said second transceiver wherein the data is stored in said remote electronic memory;

a display coupled to said remote unit wherein said display is accessible to the user, said display being operationally coupled to said remote processor; and an actuator coupled to said remote unit, said actuator being operationally coupled to said remote processor wherein said actuator actuates said remote processor.

2. The assembly according to claim 1 wherein said accelerometer being elongated along a longitudinal axis extending through a top end and a bottom end of said accelerometer.

3. The assembly according to claim 1 wherein a pair of tabs coupled to and extending laterally away from opposite sides of an outer wall of said accelerometer proximate a bottom end of said accelerometer.

4. The assembly according to claim 1 wherein an outer wall of said recorder having a length being greater than a width of said outer wall of said recorder wherein said recorder has a rectangular parallelepiped shape.

5. The assembly according to claim 1 wherein a plurality of tabs coupled to and extending laterally away from an outer wall of said recorder proximate an associated one of each of four corners of said outer wall of said recorder.

6. The assembly according to claim 1 wherein said electronic memory being electrically coupled to said processor.

7. The assembly according to claim 1 wherein:

said second transceiver being electrically coupled to said electronic memory; and said second transceiver being in electromagnetic communication with said first transceiver.

8. The assembly according to claim 1 wherein said gps being electrically coupled to said processor.

9. The assembly according to claim 1 wherein said gps being in electromagnetic communication with a satellite.

10. The assembly according to claim 1 wherein said clock being electrically coupled to said gps.

11. The assembly according to claim 1 wherein said remote electronic memory being electrically coupled to said remote processor.

12. The assembly according to claim 1 wherein:

said remote transceiver being electrically coupled to said remote electronic memory; and said remote transceiver being in selective electromagnetic communication with said second transceiver.

13. The assembly according to claim 1 wherein:

said display being coupled to a front side of an outer wall of said remote unit proximate a top side of said outer wall of said remote unit;

said display being electrically coupled to said remote processor; and said display displaying indicia.

14. The assembly according to claim 1 wherein:

said actuator being coupled to a front side of an outer wall of said remote unit proximate a bottom side of said outer wall of said remote unit;

said actuator being electrically coupled to said processor;

said actuator being one of a plurality of said actuators; and a first one of said plurality of actuators comprising a dial rotatably coupled to said remote unit.

15. The assembly according to claim 1 wherein:

a first power supply coupled to said recorder;

said first power supply being electrically coupled to said first processor;

said first power supply comprising at least one battery;

a remote power supply coupled to said remote unit;

said remote power supply being electrically coupled to said remote processor; and said remote power supply comprising at least one battery.

16. A data recording assembly for monitoring and recording the activity of a vehicle, said assembly comprising:

an accelerometer coupled to the vehicle;

a first transceiver coupled to said accelerometer;

a recorder coupled to the vehicle;

a processor coupled to said recorder;

an electronic memory coupled to said recorder, said electronic memory being operationally coupled to said processor;

a second transceiver coupled to said recorder, said second transceiver being operationally coupled to said electronic memory, said second transceiver being in communication with said first transceiver wherein said second transceiver receives data from said accelerometer wherein the data is stored in said electronic memory;

a gps coupled to said recorder, said gps being operationally coupled to said processor, said gps being in communication with a satellite wherein said gps determines a location of the vehicle;

a clock coupled to said recorder, said clock being electrically coupled to said gps, said clock monitoring a time of the vehicle's activity;

a remote unit configured to be carried by a user;

a remote processor coupled to said remote unit;

a remote electronic memory coupled to said remote unit, said remote electronic memory being operationally coupled to said remote processor;

a remote transceiver coupled to said remote unit, said remote transceiver being operationally coupled to said remote electronic memory, said remote transceiver being in communication with said second transceiver wherein said remote transceiver receives the data from said second transceiver wherein the data is stored in said remote electronic memory;

a display coupled to said remote unit wherein said display is accessible to the user, said display being operationally coupled to said remote unit; and an actuator coupled to said remote unit, said actuator being operationally coupled to said remote processor wherein said actuator actuates said remote processor.

17. The assembly according to claim 16 wherein said accelerometer being elongated along a longitudinal axis extending through a top end and a bottom end of said accelerometer; a pair of tabs coupled to and extending laterally away from opposite sides of an outer wall of said accelerometer proximate a bottom end of said accelerometer; an outer wall of said recorder having a length being greater than a width of said outer wall of said recorder wherein said recorder has a rectangular parallelepiped shape; a plurality of tabs coupled to and extending laterally away from an outer wall of said recorder proximate an associated one of each of four corners of said outer wall of said recorder.

18. The assembly according to claim 16 wherein said electronic memory being electrically coupled to said processor; said second transceiver being electrically coupled to said electronic memory; said second transceiver being in electromagnetic communication with said first transceiver; said gps being electrically coupled to said processor; said gps being in electromagnetic communication with a satellite; said clock being electrically coupled to said gps; said remote electronic memory being electrically coupled to said remote processor.

19. The assembly according to claim 16 wherein said remote transceiver being electrically coupled to said remote electronic memory; said remote transceiver being in selective electromagnetic communication with said second transceiver; said display being coupled to a front side of an outer wall of said remote unit proximate a top side of said outer wall of said remote unit; said display being electrically coupled to said remote processor; said display displaying indicia; said actuator being coupled to a front side of an outer wall of said remote unit proximate a bottom side of said outer wall of said remote unit; said actuator being electrically coupled to said processor; said actuator being one of a plurality of said actuators; a first one of said plurality of actuators comprising a dial rotatably coupled to said remote unit.

20. The assembly according to claim 16 wherein a first power supply coupled to said recorder; said first power supply being electrically coupled to said first processor; said first power supply comprising at least one battery; a remote power supply coupled to said remote unit; said remote power supply being electrically coupled to said remote processor; said remote power supply comprising at least one battery.

* * * * *